United States Patent
Ashkenazi et al.

(10) Patent No.: US 10,261,887 B1
(45) Date of Patent: Apr. 16, 2019

(54) METHOD AND SYSTEM FOR COMPUTERIZED DEBUGGING ASSERTIONS

(71) Applicant: Cadence Design Systems, Inc., San Jose, CA (US)

(72) Inventors: Yonatan Ashkenazi, Rehovot (IL); Nadav Chazan, Ness Ziona (IL); Maayan Ziv, Haifa (IL)

(73) Assignee: Cadence Design Systems, Inc., San Jose, CA (US)

( * ) Notice: Subject to any disclaimer, the term of this patent is extended or adjusted under 35 U.S.C. 154(b) by 112 days.

(21) Appl. No.: 15/497,255

(22) Filed: Apr. 26, 2017

(51) Int. Cl.
*G06F 11/00* (2006.01)
*G06F 11/36* (2006.01)

(52) U.S. Cl.
CPC ...... *G06F 11/3636* (2013.01); *G06F 11/3624* (2013.01)

(58) Field of Classification Search
CPC ................ G06F 11/3624; G06F 11/3636
See application file for complete search history.

(56) References Cited

U.S. PATENT DOCUMENTS

| | | | | | |
|---|---|---|---|---|---|
| 6,463,553 | B1* | 10/2002 | Edwards | ............. | G06F 11/3636 714/31 |
| 6,557,119 | B1* | 4/2003 | Edwards | ............. | G06F 11/3648 714/31 |
| 2011/0107307 | A1* | 5/2011 | Liu | ...................... | G06F 11/3664 717/125 |
| 2016/0188440 | A1* | 6/2016 | Bates | .................. | G06F 11/3624 717/129 |

* cited by examiner

*Primary Examiner* — Joshua P Lottich
(74) *Attorney, Agent, or Firm* — Pearl Cohen Zedek Latzer Baratz LLP

(57) ABSTRACT

A method for assertion debugging may include identifying in signals relating to an execution run of a code a segment of time for which an assertion has failed. The method may also include searching in the signals relating to that execution run, or in signals relating to another execution run of that code, to find one or a plurality of segments of time in which the signals are similar to the signals in the identified segment, for which the assertion was successful.

10 Claims, 3 Drawing Sheets

Fig. 1

Message
ncsim: *E,ASRTST (./test.v,8): (time 348 NS) Assertion
A2: assert property (@(posedge clk) disable iff (!reset
ncsim: *E,ASRTST (./test.v,9): (time 368 NS) Assertion
A1: assert property (@(posedge clk) disable iff ((reset
ncsim: *E, ASRTST (./test. v,8): (time 368 NS) Assertion
A2: assert property (@(posedge clk) disable iff (!reset
ncsim: *E,ASRTST (./test.v,9): (time 372 NS) Assertion
A1: assert property (@(posedge clk) disable iff ((reset
ncsim: *E, ASRTST (./test. v,8): (time 372 .NS) Assertion
A2: assert property (@(posedge clk) disable iff (!reset

Scope:test
 'h0→→'h1 'h0 'h1 → 'h0 'h1 'h1 'h1
reg clk,a,b,rst,x,clk1;
 'h1
reg reset = 1;
inactive → active 'h0→'h1 'h1 'h1→'h0 'h1 'h1
A1: assert property (@(posedge clk) disable iff
((reset) !==1'b1) b| => x  ##1 !x[*1:2] ##1 x);
inactive → active 'h0→'h1 'h1 'h1→'h0 'h1 'h1
A2: assert property (@(posedge clk) disable iff
(!reset) b| => x  ##1 !x[*1:2] ##1 x);
initial SmartLog
RCA
Waveform
Variables
Call Stack
Time Tables
Tops
Search Results
Data Exploration
Instances
Breakpoints
Diagnostics
Active Threads

Waveform

| Name | Temp |
|------|------|
| b | 0 |
| x | 1 |
| reset | 1 |
| A2 | Finished |
| b | 0 |
| x | 1 | ida::test.b 4 ns    0    100    200    300

METHOD AND SYSTEM FOR COMPUTERIZED DEBUGGING ASSERTIONS

FIELD OF THE INVENTION

The present invention relates to a computerized debugging. More particularly, the present invention relates to a method and system for computerized debugging of assertions.

BACKGROUND OF THE INVENTION

Often, when code is being debugged, a problem manifested at one location of the code is rooted elsewhere (somewhere earlier in the code), where it was caused, making it difficult to identify and isolate the problem. By adding assertions to the code, assumptions may be examined and compared with the actual behavior of the code when executed.

Assertions may provide a useful tool that allows documenting an assumption within the code and having this assumption checked automatically at run-time or post-process.

Typically, an assertion includes a predicate, or Boolean condition, that the user—typically a debugging expert (hereinafter referred to as the "user")—expects to be always true. If the condition returns false, then the assumption is found to be incorrect. An incorrect assumption may indicate that there is a bug in the code. A debugging tool may trigger, upon determining the existence of a false assertion, a halt of the execution, so as to allow the user to determine the cause of the problem.

Programmers may use assertions to help specify programs and to reason about program correctness.

SUMMARY OF THE INVENTION

There is thus provided, in accordance with some embodiments of the present invention, a method for assertion debugging. The method may include identifying in signals relating to an execution run of a code a segment of time for which an assertion has failed. The method may also include searching in the signals relating to that execution run, or in signals relating to another execution run of that code, to find one or a plurality of segments of time in which the signals are similar to the signals in the identified segment, for which the assertion was successful.

In some embodiments of the invention, the method may also include modifying the assertion and presenting the modified assertion to a user over a display screen.

In some embodiments, modifying of the assertion may include amending preconditions or postconditions of the assertion to comply with the signals of the found one or a plurality of segments.

In some embodiments, the signals of said one or a plurality of segments may be considered similar to the signals in the identified segment if they are almost identical, except for one or up to a predetermined number of differences in details of the signals.

In some embodiments, the details may be selected from the group consisting of number of clock cycles and shape of the signals.

According to some embodiments, the method may also include presenting said found one or a plurality of segments to a user on a display screen.

In some embodiments, said found one or a plurality of segments are presented to a user on a display screen in an order of relevance.

There is also provided, according to some embodiments of the invention, a system for assertion debugging. The system may include a memory and a processor configured to: identify in signals relating to an execution run of a code a segment of time for which an assertion has failed; and search in the signals relating to that execution run, or in signals relating to another execution run of that code, to find one or a plurality of segments of time in which the signals are similar to the signals in the identified segment, for which the assertion was successful.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 illustrates a debug analyzer graphical user interface (GUI), displaying code with assertions according to some embodiments of the present invention.

DETAILED DESCRIPTION OF THE PRESENT INVENTION

Figure 2:
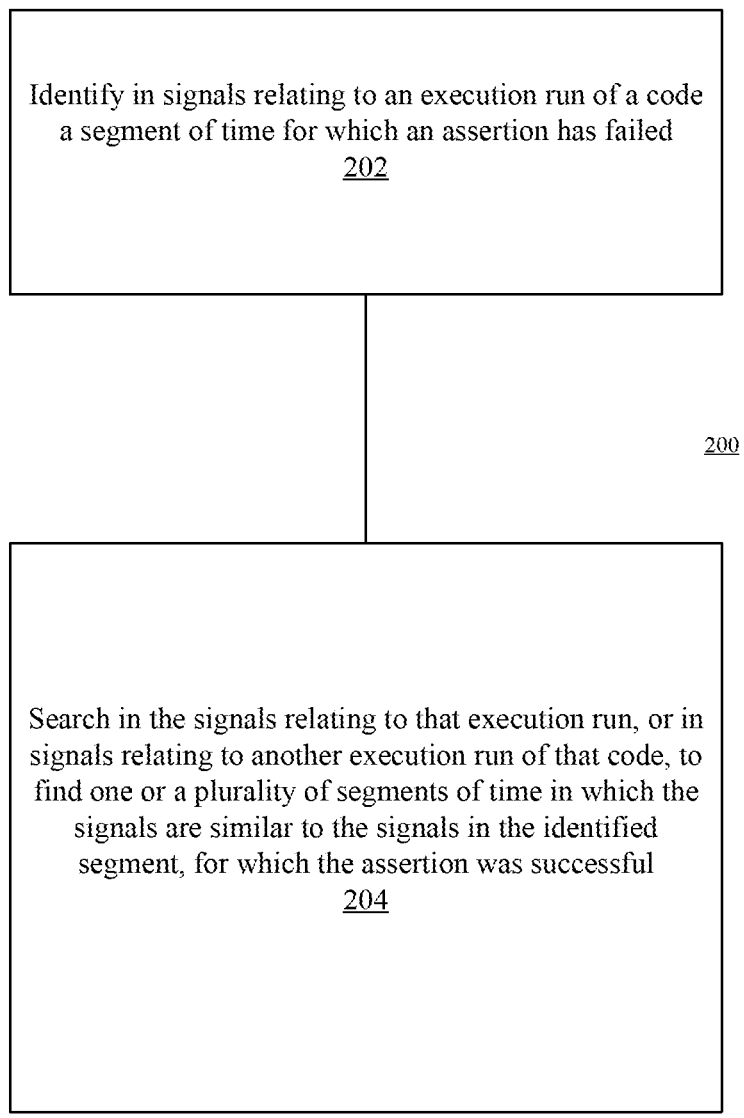
FIG. 2 illustrates a method for assertion debugging according to some embodiments of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as is apparent from the following discussions, it is appreciated that throughout the specification, discussions utilizing terms such as "adding", "associating" "selecting," "evaluating," "processing," "computing," "calculating." "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

Systems and methods according to some embodiments of the present invention may relate to on-line debugging and/or to post-process debugging.

Typically debugging may be performed on the fly (on-line, e.g., step debugging) or as a post-process.

Post-process debugging was introduced which involves recording a specific program execution and allowing an on-line or off-line analysis of that execution. When recording the execution, all execution events that had occurred in that execution are saved.

An "execution event can include any event that has occurred during the execution of the program, and may include, for example, a code line that was executed, a routine that was called, a parameter that was calculated, a variable that has been assigned a value, a signal's value being changed, a register being assigned with a value, a status of a computing environment, an indication (e.g., text, line, or location within a source code representation or other representation of the software program being debugged, a function currently being executed, an instruction that called the function being currently executed, or other indication) of an instruction that is being executed or that was most recently executed, an address of a variable or instruction, or other relevant information that may be displayed or otherwise made available to a user of the debugging tool, etc.

Information relating to the execution events encountered during an execution may be recorded (e.g., saved into a database, memory, etc.) to, for example, allow the review of the recorded execution in a user interface while mimicking the look and feel of a regular debugging tool. Thus, the human user (hereinafter—user) can go back and forth (up to the last execution event that was recorded) and view various execution events of that specific execution, including the related information of these events. Using such a post-process debug method can allow the user to analyze any execution event and/or find the execution events that caused it to occur the way that execution event had occurred.

Assertions can specify and validate the expected behavior of a code (e.g., a program code and/or a code modelling a design). They may be written directly in the source code to monitor signal values over a period of time. Assertions may be used to declare that something must always hold. If an assertion is not fulfilled then a bug in the code is suspected.

FIG. 1 illustrates a debug analyzer graphical user interface (GUI) 100, displaying code with assertions according to some embodiments of the present invention.

GUI 100 may include several frames. For example, frame 104 may be used to present a program code to be debugged (hereinafter—the code). The program code may be, for example, written in Verilog, VHDL, System Verilog or other program language. The code may include assertions, such as assertion 103, which is indicated in this figure as selected.

Frame 104 may provide a view (scope) of messages, such as, for example, embedded messages, user-added messages, etc.

For example, a Verilog assertion 103 may look like this:

"A2: assert property (@ (posedge clk) disable iff ((reset) b|$\Rightarrow$x ##1 !x[*1:2] ##1x);"

The above assertion states that whenever the clock rises (posedge, as opposed to clock falling in negedge), if b=1 then after one clock cycle x should also be 1 for exactly one clock cycle before it drops to no more than two consecutive clock cycles. The elements of the assertion preceding the arrow (|$\Rightarrow$) are typically referred to as "preconditions" of the assertion, whereas the elements of the assertion following that arrow are typically referred to as "postconditions" of the assertion.

For that assertion to be fulfilled, all of the conditions stated in it must be fulfilled over the specified period of clock cycles. If one or more of the stated conditions did not occur in the anticipated time, then that assertion was not fulfilled. However, if the value of 'b' was not 1, then all the other conditions are not even considered and checked, thus the assertion may not be considered as not having been fulfilled.

The above assertion also goes on to state that, if 'reset' is carried out, then the rest of the conditions may not be checked and the assertion may not be considered as not having been fulfilled.

Frame 106 displays waveforms of signals of variables related to the selected assertion: 'b' (top line), 'x' (second line), 'reset' (third line), result of the selected assertion A2 (the selected assertion, fourth line). As the assertions in this example relate to periods defined in clock cycles, the results appear as 'true' (successfully fulfilled) or 'false' (failed, unfulfilled) blocks. In some embodiments of the present invention, the 'true' or 'false' blocks may be distinguished by marking them in a distinctive manner, such as, for example, using different colors, different patterns, etc.

Assertions in VHDL and Verilog typically relate to a time frame of one or several clock cycles. Thus, in order to review such assertions, the related time period ought to be examined. In some, there may be instances where an assertion will relate to a single point in time. In such cases, the assertion result may be displayed with respect to a single point over the waveforms. For example, a successful assertion may be flagged using a particular indication marker (e.g., a green flag, whose post points to the exact location of the related point in time, to flag a successful assertion and a red flag to flag a failed assertion).

The frame in which waveforms are displayed may cover the entire execution time (also known as run time) of the code, or a segment in time of the execution of the code. In some embodiments, the user may zoom in and zoom out to see smaller or greater segments of waveforms corresponding to smaller or greater segments of time of the run time.

In some embodiments of the present invention, the execution of a code may be halted upon occurrence of a failed assertion. In some embodiments of the invention, the execution may continue even when an assertion fails.

Debugging assertions (e.g., System Verilog assertions and other assertions) and especially concurrent assertions may be a difficult and tedious task to perform. There may be various reasons for this difficulty: the person debugging the failed assertion may not be the same person who write that assertion, the assertion itself may be hard to understand and debug, there may be many alternative logical paths that could have led to successful fulfillment of that assertion (and not all of them may be relevant), etc.

In some embodiments, the invention involves suggesting to the user relevant and achievable paths that can cause the assertion to successfully pass and/or suggest a small modification to the assertion that may cause that assertion to be successfully fulfilled.

For example, consider the following assertion:

"assert property (@(posedge clk) a##[1:3]b|$\Rightarrow$(c|d))".

This assertion states that whenever a=1 and is followed by b=1 in either 1, 2 or 3 consecutive clock cycles—c or d is expected to have the value of 1 one clock cycle later.

When a user wants to understand what went wrong that caused that assertion to fail, that user may have to consider many questions and possible directions, such as, for example:

1. Why did c not get the value of 1 during the prescribed time?

2. Why did d not get the value of 1 during the prescribed time?

3. Was it possible that b should not have been assigned the value of 1 at the relevant time (omitting the need to check right hand side of the assertion)?

4. Was it possible that a should not have been assigned the value of 1 at the relevant time (omitting the need to check right hand side of the assertion)?

5. Is it possible that the assertion is wrong?

6. If the assertion is wrong, can there be a modified assertion that better represents the true behavior of the examined portion of the code?

Each such direction can require the user to spend considerable debugging time. It is noted that the questions raised are negated: "why not" rather than "why".

Register Transfer Lever (RTL) debug tools are typically designed to answer "why" questions. Using driver tracing, for example, the user may follow the cone of logic that has caused a signal to receive a certain value at a certain time. The Debugging a "why not" question can be a much more complex and harder task. The user can be required to consider all possible paths that may have caused a certain signal to have a certain value at a certain time, but did not occur in the actual execution of the code. The user may then identify the path that was actually meant to be taken during the execution of the code, and figure out why that path was not taken. Such process may require the user to follow many possible paths, many of which may not be relevant to the particular code, and reach a conclusion that the assertion was incorrect, and needs amending—all of the above can require substantial amount of time.

In some embodiments, the invention involves examining signals corresponding to the assertion in the same execution run of the code or other execution runs of the code, and identify segments of signals which successfully passed the assertion, and which are similar to the signals segment for which the assertion failed, and find out the difference, assuming that that difference is what made it possible for the assertion to successfully pass. In some embodiments of the invention, examining of the signals involves comparing values of the related signals over time.

The logic in looking for segments of signals which successfully passed the assertion, and which are similar to the signal segment for which the assertion failed, may be based on the assumption that it is easier to identify slightly different preconditions or postconditions in signal segments in which the assertion successfully passed that painstakingly searching for causes of the unsuccessful assertion by analyzing each of the preconditions or the postconditions and tracing them backwards. Thus, it may be prudent to start analyzing the reasons for the assertion failure by comparing very similar scenarios of segments in which the signals were very similar to the signals in the segment corresponding to the failed assertion, but for which the assertion was successfully passed.

In some embodiments, the similarity may dictate similarity of the actual signals. It may be desired to find only segments that almost fully comply with the preconditions or postconditions of the failed assertion.

In some embodiments, similarity may allow for segments of different duration of clock cycles to be considered as similar segments.

In general, a level of similarity may be predetermined. In some cases, only nearly identical segments would be considered similar. In other cases, similarity may be declared even in cases where the durations of the segments are identical but the signals are not identical only nearly identical. "Nearly identical" may relate, for example, to signal segments that identical except for a one or a plurality of differences in their details, wherein the one or plurality of differences amounts to no more than a predetermined number of differences. For example, the predetermined number of differences may be one or a few differences (e.g., 1, 2, 3, 4, 5 . . . etc.). The "details" of the signals may relate to values, changes in the values, length of the segments, e.g., number of clock cycles, preconditions, and postconditions in the assertion, etc.

For example, the assertion example above has preconditions and postconditions. The preconditions are the conditions that are supposed to be met before the rest of the assertion is checked. The postconditions are the conditions that are to be met when the preconditions are met in order to declare the assertion as successful. Similarity in the preconditions would typically render the found segments more relevant. Further, in accordance with some embodiments of the invention, the found segments may be compared with the segment of the failed assertion. In this comparison, differences in the postconditions may be considered more relevant than differences in the preconditions, when presenting the proposed segments to the user.

In some embodiments of the invention, the failed assertion may be amended in a way that causes the amended assertion to pass both at the instance of failure and in the rest of the run.

In some embodiments of the present invention, the found segment or segments of time in which the signals are similar to the signals in the segment of the failed assertion may be presented to the user on the GUI.

It is asserted that the user may find it much easier and simpler to review examples of segments where the assertion was successful, according to some embodiments of the invention, than to do back tracing for all possible causes for the assertion failure.

In some embodiments the found segment or segments may be presented in order of relevance to the user. For example, segments which are more similar to the segment of the failed assertion may be presented before (e.g., higher on the display screen) other found segments that are less similar to the segment of the failed assertion.

For example, when considering the assertion ["Assert property (@(posedge clock) a ##[1:3] b|⇒(c|d))"] has 2 parts—a precondition ("a ##[1:3] b") and the postcondition ("(c|d)"). For such an assertion, according to some embodiments of the invention, segments where the precondition was met and the postcondition also held true will be presented before segments where the precondition was not met. This order of relevance is based on an assumption that the prior segments are more likely to be helpful to the debug effort than the former.

Similarly, segments that may be found in the current execution run may be indicated to be of higher relevance than segments found in other execution runs of the code.

According to some embodiments of the invention, modified assertions may be presented to the user on the display screen. Modified assertions may be one or a plurality of assertions based on the currently considered assertion but with a modification. The modification may relate to one or a plurality of preconditions or postconditions of the assertion. For example, the modified assertion may dictate that a certain condition be met over a number of clock cycles which is slightly different then the number of clock cycles in the original assertion.

The suggested modifications to the original assertion may be, for example, selected arbitrarily or based on an analysis of the execution run or other execution runs of the code.

In some embodiments of the invention, the modified assertions may be generated using Electronic Design Automation (EDA) tools (e.g., formal verification tools).

The modified assertion or assertions may be presented to the user over a display screen, and the user may be offered to select any of the modified assertions and use the selected assertion or assertion in testing the code in a future execution run.

According to some embodiments of the invention, the suggested modified assertion or assertions may be presented in connection with the presentation of found examples of successful segments, or separately.

FIG. 2 illustrates a method 200 for assertion debugging according to some embodiments of the invention. Method 200 may include identifying 202 in signals relating to an execution run of a code a segment of time for which an assertion has failed. Method 200 may also include searching 204 in the signals relating to that execution run, or in signals relating to another execution run of that code, to find one or a plurality of segments of time in which the signals are similar to the signals in the identified segment, for which the assertion was successful.

Such method may further include modifying the assertion and presenting the modified assertion to a user over a display screen.

In some embodiments, modifying of the assertion may include amending preconditions or postconditions of the assertion to comply with the signals of the found one or a plurality of segments.

In some embodiments, the signals of said one or a plurality of segments are considered similar to the signals in the identified segment if they are nearly identical.

In some embodiments, the signals of said one or a plurality of segments may be considered similar to the signals in the identified segment if they are identical except for one or up to a predetermined number of differences in details of the signals.

In some embodiments, the details maybe selected from the group consisting of number of clock cycles and shape of the signals.

In some embodiments, the method may also include presenting said found one or a plurality of segments to a user on a display screen.

In some embodiments, said found one or a plurality of segments are presented to a user on a display screen in an order of relevance.

Figure 3:
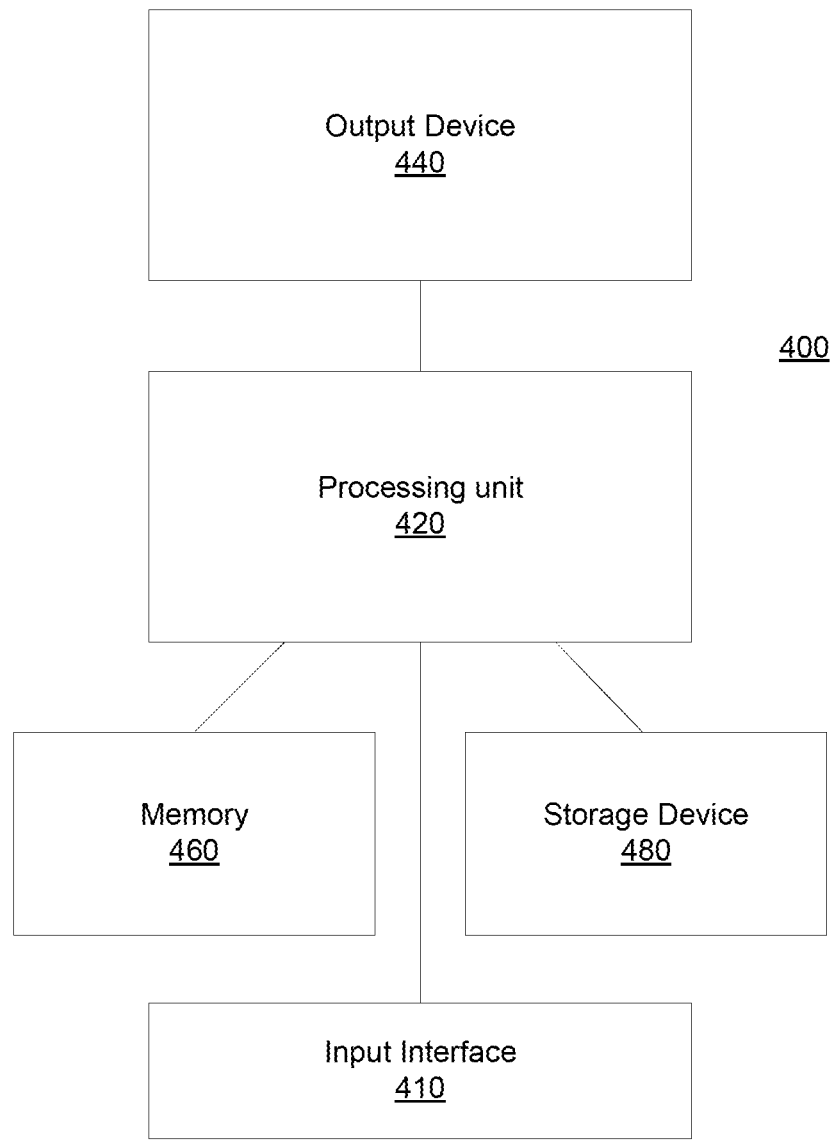
FIG. 3 illustrates a system for assertion debugging according to some embodiments of the invention.

FIG. 3 illustrates a system for assertion debugging according to some embodiments of the invention.

System 400 may include a processing unit 420 (e.g., one or a plurality of processors, on a single machine or distributed on a plurality of machines) for executing a method according to some embodiments of the present invention. Processing unit 420 may be linked with memory 460 on which a program implementing a method according to some embodiments of the present invention and corresponding data may be loaded and run from, and storage device 480, which includes a non-transitory computer readable medium (or mediums) such as, for example, one or a plurality of hard disks, flash memory devices, etc. on which a program implementing a method according to some embodiments of the present invention and corresponding data may be stored. System 400 may further include an output device 440 (e.g., display device such as CRT, LCD, LED, etc.) on which one or a plurality user interfaces associated with a program implementing a method according to some embodiments and corresponding data may be presented. System 40 may also include input device 410, such as, for example, one or a plurality of keyboards, pointing devices, touch sensitive surfaces (e.g., touch sensitive screens), etc. for allowing a user to input commands and data.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that, when executed, cause a processor to execute method steps in accordance with examples. In some examples, the instructions stored on the computer readable medium may be in the form of an installed application and in the form of an installation package.

Such instructions may be, for example, loaded by one or more processors and be executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An assertion debug method comprising:
identifying in signals relating to an execution run of a code a segment of time for which an assertion has failed; and
searching in the signals relating to that execution run, or in signals relating to another execution run of that code, to find one or a plurality of segments of time in which the signals are identical to the signals in the identified segment for which the assertion was successful except for one or up to a predetermined number of differences in details of the signals.

2. The method of claim 1, further comprising modifying the assertion and presenting the modified assertion to a user over a display screen.

3. The method of claim 2, wherein modifying of the assertion comprises amending preconditions or postconditions of the assertion to comply with the signals of the found one or a plurality of segments.

4. The method of claim 1, wherein the details are selected from the group consisting of number of clock cycles, values, preconditions of the assertion, postconditions of the assertion, and shape of the signals.

5. The method of claim 1, further comprising presenting said found one or a plurality of segments to a user on a display screen.

6. The method of claim 5, wherein said found one or a plurality of segments are presented to a user on a display screen in an order of relevance.

7. A system for assertion debugging comprising:
a memory, and
a processor configured to:
identify in signals relating to an execution run of a code a segment of time for which an assertion has failed; and
search in the signals relating to that execution run, or in signals relating to another execution run of that code, to find one or a plurality of segments of time in which the signals are identical to the signals in the identified segment for which the assertion was successful except for one or up to a predetermined number of differences in details of the signals.

8. The system of claim 7, wherein the processor is further configured to modify the assertion.

9. The system of claim 8, wherein amending of the assertion comprises amending preconditions or postconditions of the assertion to comply with the signals of the found one or a plurality of segments.

10. The system of claim 7, wherein the details are selected from the group consisting of number of clock cycles, values, preconditions of the assertion, postconditions of the assertion, and shape of the signals.

* * * * *